Feb. 16, 1954
G. E. HANSEN
2,669,253
COMBINED SHUTOFF AND RELIEF VALVE
Filed June 21, 1951
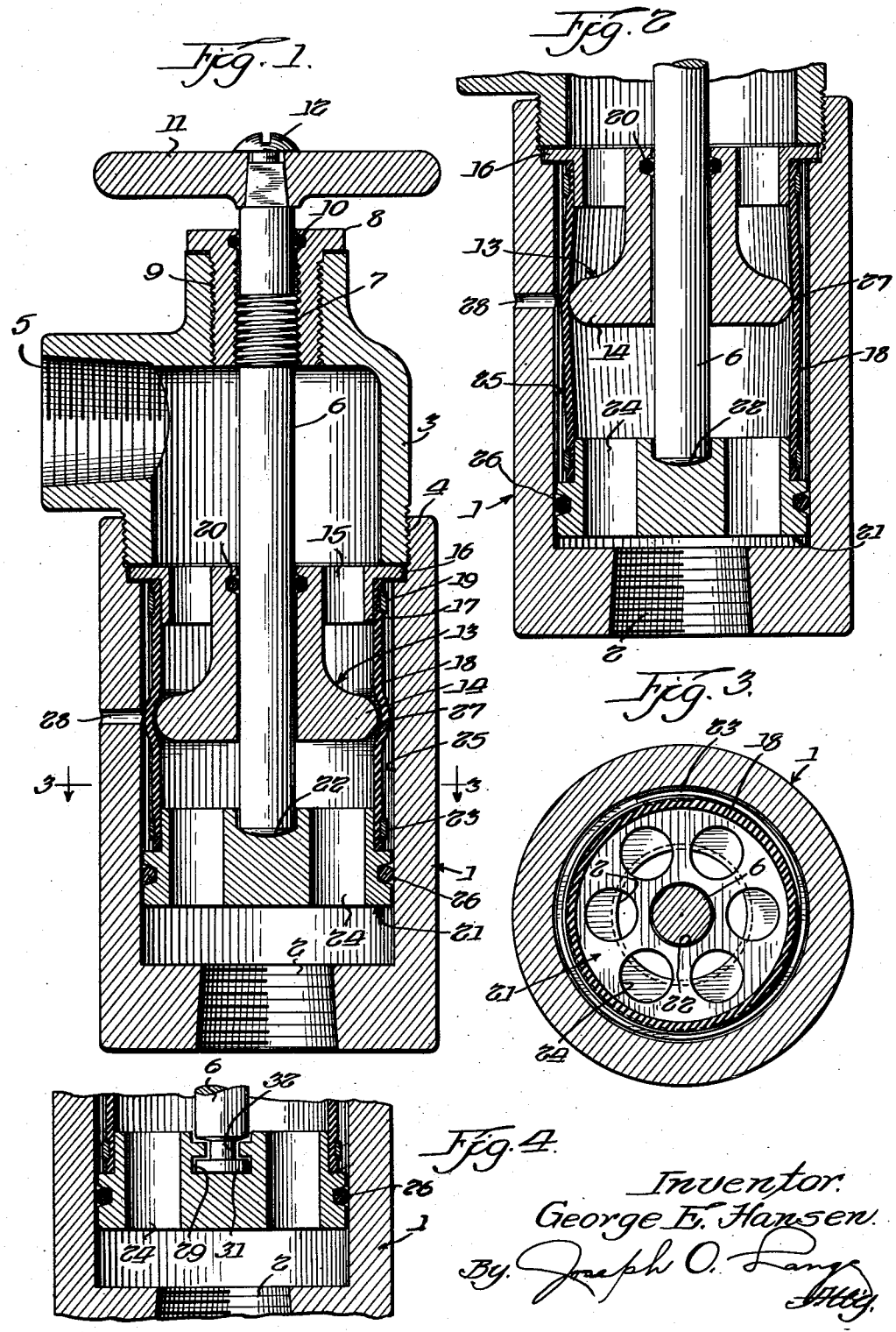
Inventor.
George E. Hansen Patented Feb. 16, 1954

2,669,253

UNITED STATES PATENT OFFICE 2,669,253

COMBINED SHUTOFF AND RELIEF VALVE

George E. Hansen, Chicago, Ill., assignor to Crane Co., Chicago, Ill., a corporation of Illinois Application June 21, 1951, Serial No. 232,732

8 Claims. (Cl. 137—525)

This invention relates to a combined shut-off and relief valve. More particularly, it is concerned with a novel form of valve construction, in which a tubular distortable member, such as a sleeve, may be combined with a spider to provide a novel seating or shut-off means.

Another object is to provide for a valve construction, in which a distortable sleeve member may be easily renewed, and the entire valve mechanism may be removed as a unit.

Another object is to provide for a valve construction using a rubber sleeve insertable over a periphery of a fixed seat and by merely actuating a handwheel on the stem in one direction, the rubber sleeve is stretched over the seat, while in the other direction the rubber is released and thus allows the flow to pass through the valve.

Other objects and advantages will become more readily apparent upon proceeding with a description of the device in which Fig. 1 is a sectional assembly view of a valve incorporating the invention.

Fig. 2 is a fragmentary sectional view of the valve shown in Fig. 1 with the valve in the closed position.

Fig. 3 is a section taken on line 3—3 of Fig. 1.

Fig. 4 is a modified form of the invention.

Similar reference numerals refer to similar parts throughout the several views.

Referring now to Fig. 1, a valve casing, generally designated 1, is shown having the inlet 2 and provided at the upper end portion with the centerpiece 3 threadedly attached to the casing, as at 4. The centerpiece 3 in this particular configuration is provided with a side outlet 5 which like the inlet 2 is suitably threaded as indicated for connection with a pipe line (not shown). In the upper end portion of the centerpiece, a stem member 6 is threaded, as at 7, within a bushing 8 which is also threadedly received within the centerpiece 3, as at 9. The stem 6 at its upper limits is provided with a handwheel 11 suitably attached by means of the wheel handscrew 12. Midway between its lower end portion, the stem 6 is journalled within a spider type of seat, generally designated 13, having an enlarged cylindrical lower portion as indicated at 14 for reasons hereinafter explained in more detail. The spider 13 is provided with suitable annularly arranged apertures 15 and is held in relatively axially fixed position by means of a clamping arrangement as indicated by the flanged portion 16. Its upper depending annular portion 17 has clamped around it the rubber sleeve 18 held securely in place by means of an annular clamp 19. At its lower end portion, the rubber sleeve 18 clamps around a movable spider, generally designated 21, and which is mounted in abutting relation with the end of the stem, as at 22, for reasons hereinafter made clear. At 20, an O-ring serves as a fluid seal for the stem. The lower end of the sleeve 18 is fixedly held to the movable spider 21 by means of the clamp 23. The said movable spider has the annularly positioned apertures 24, the arrangement of which latter elements is more clearly shown in Fig. 3.

Preferably, in order to provide a fluid sealing contact, the movable spider is fitted within the bore 25 of the casing 1 by means of an O-ring 26. It will be noted that the diameter of the enlarged portion of the spider, as at 14, is preferably made sufficiently large to allow an annular clearance between the bore 25 and the head peripheral surface 27 between which clearance the depending sleeve 18 extends. As shown in Fig. 1, the valve stem may be sufficiently retracted on its thread 7 so as to draw up and mount the sleeve 18 relatively loosely over the peripheral surface 27 of the enlarged part of the periphery of the spider. Thus, line fluid flow therepast will occur coming in at the inlet 2 passing upwardly through the apertures 24 of the movable spider member and into the inside of the sleeve, past the head surface 27 and between the upper inside portion of the sleeve 18, then moving upwardly through the annular apertures 15 into the centerpiece 3 and thence outwardly through the valve connecting outlet 5. As shown more clearly in Fig. 2, when the valve stem 6 is rotated on its threads 7 so as to move the lower spider 21 to the lowermost position, the sleeve 18 is stretched around the surface 27 of the lower depending portion 14. It will be clear that with the stationary spider 13 in this position, the sleeve being drawn snugly over the peripheral surface 27 will provide a relatively tight annular sealing connection and prevent the passage of fluid therearound. In order to allow for the emission of any air which might be trapped between the outside diameter of the sleeve and the bore 25 of the casing 1, a bleedhole 28 is provided, as shown.

In functioning as a relief valve, it will, of course, be clear that the stem 6 may be moved axially downward to such degree as desired, thereby creating the amount of stretch to the sleeve 18. In response to fluid pressure passing within the inlet 2 and the ports 24, and depending upon the degree of such pressure, the sleeve 18 may be bulged outwardly, as at surface 27, as indicated in Fig. 1. This will permit the desired fluid discharge.

As to the modified form in Fig. 4, it may be desirable in some instances to provide a positive connection between the stem 6 and the movable spider 21. In such case, the spider is provided with a diametrically extending groove 29 within which the T-head 31 is received, the stem head being joined to the stem by the neck 32. In this construction, it will be clear that the spider 21 may be moved positively in either direction axially, thereby permitting use on throttle service, metering, or the like.

The specific manner in which the end result is obtained may, of course, vary, and the principle of operation may, therefore, be exemplified in many forms within the spirit of the invention.

I claim:

1. In a combined shut-off and relief valve, a casing, a centerpiece therefor having an outlet therefrom, a stationary spider, a movable spider, the said stationary spider having depending therefrom a flexible sleeve and a central annular portion projecting within the inner periphery of said sleeve, the movable spider being clamped to a lowermost end portion of the said flexible sleeve, a stem for moving the said movable spider reciprocally, the diameter of the central annular portion of the said stationary spider being slightly larger than that portion of the movable spider to which said flexible sleeve is clamped, an inner annular portion of the said sleeve contacting the outer annular surface of the said annular portion of the said stationary spider upon predetermined axial movement of the said movable spider, each of the said spiders having ported passages, the passage of the stationary spider being in communication with the interior of the said casing to permit flow therethrough upon predetermined axial movement of the said movable spider towards the stationary spider.

2. In a combined relief valve and shut-off valve, a body therefor having an inlet, a centerpiece mounted on the said body and having an outlet in communication with the interior of the said body, a stationary spider with a lower depending enlarged portion, the said spider being clamped between said centerpiece and body, a movable spider below the said stationary spider, a flexible sleeve attached to the said movable spider and the stationary spider, a stem for effecting reciprocating movement of the said movable spider, the said stem projecting through the stationary spider in fluid sealing relation, each of the said spiders being ported to provide fluid passages between the said body inlet and centerpiece outlet, the said movable spider upon predetermined axial movement toward the said stationary spider allowing for an annular space to be formed between the inside wall of the said flexible sleeve and the periphery of the enlarged portion of the said stationary spider thereby to allow for fluid flow through the ports of the spiders and into the centerpiece outlet, movement in an opposite direction allowing for a fluid tight annular joint to be effected between said peripheral enlarged portion of the fixed spider and an inside annular surface of the said flexible sleeve, the enlarged depending portion of the said stationary spider being of a greater diameter than those portions of the movable and stationary spiders to which the flexible sleeve is attached.

3. In a combined relief valve and shut-off valve, a body therefor having an inlet, a centerpiece mounted on the said body having a side outlet in communication with the interior of the said body, a stationary spider with a lower depending enlarged portion and clamped between said centerpiece and body, a movable spider positioned below the said stationary spider, a flexible sleeve attached at end limits thereof respectively to the said movable spider and the stationary spider, a threaded stem for effecting the reciprocating movement of the said movable spider, the said stem projecting through the stationary spider, the said movable spider upon axial movement toward the said stationary spider allowing for an annular space to be formed between the inside wall of the said flexible sleeve and the outer periphery of the enlarged portion of the said stationary spider, each of the said spiders being ported to allow for fluid flow therethrough and into the said side outlet upon the occurrence of said axial movement of the movable spider, the axial movement of the movable spider in an opposite direction allowing for a fluid tight joint to be effected between said peripheral portion of the fixed spider and an inside annular surface of the said flexible sleeve, the said stem being axially movable relative to the said stationary spider in the first-named axial movement, the said lower depending portion of the stationary spider being substantially larger than the said end limits of the movable and stationary spiders.

4. In a combined shut-off and relief valve, a body, a centerpiece therefor having an outlet therefrom, a stationary spider attached to the body and centerpiece and having an enlarged central portion, a movable spider within the said body, the stationary spider having depending therefrom a flexible sleeve, each of the spiders being ported and predeterminately in communication with the said outlet, the movable spider being clamped to a lowermost end portion of the said flexible sleeve, a stem for moving the said movable spider reciprocally to form an annular space predeterminately between the sleeve and the stationary spider enlarged portion, the inner annular portion of said sleeve contacting the outer annular surface of the enlarged central portion of the said stationary spider upon suitable stretching of said sleeve and predetermined axial movement of the said movable spider relative to the stationary spider, the said enlarged central portion of the said stationary spider being larger than the clamped lowermost end portion of the said sleeve.

5. In a combined shut-off and relief valve, a centerpiece therefor having a side outlet therefrom, a stationary spider, a movable spider below the stationary spider, both spiders being ported and predeterminately in communciation with the said side outlet, the stationary spider having a central enlarged portion and depending therefrom a flexible sleeve extending past said central enlarged portion, the movable spider being clamped to a lowermost end portion of the said flexible sleeve below said central enlarged portion, a threaded stem for moving the said movable spider reciprocally, an inner portion of said sleeve contacting the outer annular surface of the enlarged portion of said stationary spider upon suitable axial movement of the said movable spider, the said stem being axially movable with said movable spider and rotatable relative thereto, the said stem being mounted in fluid sealing relation to said stationary spider, the said central enlarged portion of the stationary spider being larger than at least one of the portions of the said spiders connected with the said flexible sleeve.

6. In a combined relief valve and shut-off valve, a body therefor having an inlet, a centerpiece mounted on the said body and having an angle outlet in communication with the interior of the said body, a stationary spider with a lower depending enlarged portion, the said spider being clamped between said centerpiece and body, a movable spider below the said stationary spider, both of said spiders being ported and being predeterminately in communication with the angle outlet, a stretchable sleeve attached to the said movable spider and the stationary spider, the said depending enlarged portion being larger in diameter than the said sleeve at its respective places of attachment to the spiders, a stem threadedly mounted in the centerpiece for effecting reciprocating movement of the said movable spider, the said movable spider being axially movable toward the said stationary spider and allowing for an annular space thereupon to be formed between the inside wall of the said sleeve and the periphery of the enlarged portion of the said spider, the said movable spider movement in an opposite direction allowing for a fluid tight joint to be effected between said peripheral portion of the fixed spider and an inside annular surface of the said flexible sleeve, the said movable spider being mounted in fluid sealing relation to the said body.

7. In a combined relief valve and shut-off valve, a body therefor having an inlet, a centerpiece mounted on the said body and having an outlet in communication with the interior of the said body, a stationary spider with a lower depending enlarged portion, the said stationary spider being mounted between said centerpiece and body, a movable spider below the said stationary spider, each of the said spiders being ported and predeterminately allowing for fluid flow to the said outlet, a flexible sleeve attached to an upper end portion of the said movable spider and to a lower portion of said stationary spider, a stem for effecting reciprocating movement of the said movable spider, the said depending enlarged portion being larger in diameter than the said spiders at their respective places of attachment to the flexible sleeve, the said movable spider upon predetermined axial movement toward the said stationary spider allowing for an annular space for fluid flow to be formed between the inside wall of the said sleeve and the outer periphery of the depending enlarged portion of the said spider, upon movement of the said movable spider in an opposite direction a fluid tight joint is effected between the said peripheral enlarged portion of the fixed spider and an inside annular surface of the said flexible sleeve, the said stem being mounted to allow for fixed predetermined axial positioning relative to said movable spider.

8. In a combined shut-off and relief valve, a centerpiece therefor having an outlet therefrom, a stationary spider, a movable spider, each of the said spiders having ported portions predeterminately permitting fluid flow to the said outlet, the stationary spider having respectively depending therefrom a stretchable sleeve and a central enlarged portion, a movable spider attached to a lowermost end portion of the said stretchable sleeve, a stem for moving the said movable spider reciprocally, an inner annular portion of said stretchable sleeve contacting the outer annular surface of the central enlarged portion of the said stationary spider upon predetermined axial movement of the said movable spider with the said stem, the said central enlarged portion being larger in diameter than that portion of said movable spider adjacent the locus attachment of the said latter member to the said stretchable sleeve.

GEORGE E. HANSEN.

References Cited in the file of this patent

UNITED STATES PATENTS

| Number | Name | Date |
|---|---|---|
| 255,914 | Bergen | Apr. 4, 1882 |
| 2,247,363 | Dunn | July 1, 1941 |
| 2,310,628 | Grove | Feb. 9, 1943 |
| 2,328,902 | Grove | Sept. 7, 1943 |
| 2,343,584 | Scheele | Mar. 7, 1944 |
| 2,598,122 | Hansen | May 27, 1952 |